(12) United States Patent
Herring

(10) Patent No.: US 10,758,844 B2
(45) Date of Patent: Sep. 1, 2020

(54) FLUID DEGASSING DEVICES HAVING SELECTED PROFILES

(71) Applicant: Hamilton Sundstrand Corporation, Charlotte, NC (US)

(72) Inventor: Neal R. Herring, East Hampton, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 411 days.

(21) Appl. No.: 15/659,385

(22) Filed: Jul. 25, 2017

(65) Prior Publication Data
US 2019/0030460 A1 Jan. 31, 2019

(51) Int. Cl.
*B01D 19/00* (2006.01)
*B01D 63/04* (2006.01)
(Continued)

(52) U.S. Cl.
CPC ..... *B01D 19/0084* (2013.01); *B01D 19/0005* (2013.01); *B01D 19/0021* (2013.01);
(Continued)

(58) Field of Classification Search
CPC ............ B01D 19/0005; B01D 19/0021; B01D 19/0031; B01D 19/0036; B01D 19/0042;
(Continued)

(56) References Cited

U.S. PATENT DOCUMENTS

| 4,187,180 A | * | 2/1980 | Joh | ........................ | B01D 63/02 210/321.81 |
| 4,212,744 A | * | 7/1980 | Oota | ........................ | A61M 1/16 210/321.64 |

(Continued)

FOREIGN PATENT DOCUMENTS

WO          90/11812 A1       10/1990

OTHER PUBLICATIONS

Extended European Search Report prepared by, of the European Patent Office, dated Oct. 12, 2018, in corresponding European Patent Application No. 18185072.8.

*Primary Examiner* — Frank M Lawrence, Jr.
(74) *Attorney, Agent, or Firm* — Locke Lord LLP; Daniel J. Fiorello; Scott D. Wofsy

(57) ABSTRACT

A fluid degassing device can include a shell configured to retain a selectively permeable hollow fiber bundle, wherein the shell defines a first flow port and a second flow port and at least a third flow port, and a selectively permeable hollow fiber bundle having a plurality of hollow fibers disposed within the shell such that a first flow circuit is defined between the first flow port and the second flow port, and a second flow circuit is defined in fluid communication with at least the third flow port such that an inner channel of one or more of the hollow fibers is in fluid communication with at least the third flow port, wherein second flow circuit is partially fluidly isolated from the first flow circuit such that at least one first fluid cannot pass through a wall of one or more hollow fibers, but such that at least one second fluid can pass through the wall of the one or more hollow fibers. The shell and the fiber bundle include a non-cylindrical shape.

16 Claims, 3 Drawing Sheets

US 10,758,844 B2
Page 2

(51) Int. Cl.
  *B01D 63/02* (2006.01)
  *B01D 35/027* (2006.01)
  *B01D 36/00* (2006.01)

(52) U.S. Cl.
  CPC ..... *B01D 19/0031* (2013.01); *B01D 19/0036* (2013.01); *B01D 19/0042* (2013.01); *B01D 35/0273* (2013.01); *B01D 36/001* (2013.01); *B01D 36/006* (2013.01); *B01D 63/02* (2013.01); *B01D 63/04* (2013.01); *B01D 63/023* (2013.01); *B01D 63/043* (2013.01); *B01D 2313/08* (2013.01)

(58) Field of Classification Search
  CPC ............ B01D 19/0084; B01D 2131/08; B01D 35/0273; B01D 36/001; B01D 36/006; B01D 63/02; B01D 63/023; B01D 63/024; B01D 63/043
  USPC ................................ 95/46, 47, 54; 96/8, 155
  See application file for complete search history.

(56) References Cited

U.S. PATENT DOCUMENTS

| | | | | |
|---|---|---|---|---|
| 4,220,535 A | * | 9/1980 | Leonard | B01D 53/22 210/321.89 |
| 4,237,013 A | * | 12/1980 | Yamazaki | B01D 63/02 210/321.8 |
| 4,911,846 A | * | 3/1990 | Akasu | B01D 63/02 210/321.8 |
| 5,468,283 A | * | 11/1995 | French | B01D 53/22 95/45 |
| 5,855,201 A | * | 1/1999 | Fukui | B01D 53/22 128/200.11 |
| 6,315,815 B1 | | 11/2001 | Spadaccini et al. | |
| 7,264,725 B2 | * | 9/2007 | Vido | B01D 63/02 210/321.78 |
| 7,334,407 B2 | | 2/2008 | Spadaccini et al. | |
| 7,837,764 B2 | | 11/2010 | Sanford | |
| 8,293,107 B1 | | 10/2012 | Lobovsky et al. | |
| 9,566,553 B2 | | 2/2017 | Theodore et al. | |
| 9,623,369 B2 | | 4/2017 | Bikson et al. | |
| 2002/0121191 A1 | * | 9/2002 | Warren | B01D 53/047 95/11 |
| 2005/0218064 A1 | * | 10/2005 | Sengupta | B01D 19/0031 210/321.89 |
| 2007/0007193 A1 | * | 1/2007 | Uchi | B01D 63/02 210/321.79 |
| 2007/0240569 A1 | | 10/2007 | Ooya | |
| 2007/0278145 A1 | * | 12/2007 | Taylor | B01D 19/0031 210/321.6 |
| 2009/0039010 A1 | * | 2/2009 | Hayashi | B01D 63/021 210/321.8 |
| 2015/0300231 A1 | * | 10/2015 | Panziera | B01D 53/504 95/9 |

* cited by examiner

FLUID DEGASSING DEVICES HAVING SELECTED PROFILES

BACKGROUND

1. Field

The present disclosure relates to fluid degassing systems, e.g., to fuel deoxygenation systems for fuel systems.

2. Description of Related Art

Hollow fiber membrane units have been shown to be effective for fuel deoxygenation. Fuel deoxygenation enables fuel to be heated to higher temperatures without coke or varnish formation. Hollow fiber units have some desirable manufacturing and reliability features. For aerospace applications, weight and volume of the unit are a consideration to enable effective system optimization. Traditional hollow fiber membrane units have been designed as cylindrical tube shaped structures. Previous fuel deoxygenation units have utilized planar membranes and a stacked construction resulting in rectangular structures.

Such conventional methods and systems have generally been considered satisfactory for their intended purpose. However, there is still a need in the art for improved systems. The present disclosure provides a solution for this need.

SUMMARY

A fluid degassing device (e.g., for fuel deoxygenation) can include a shell configured to retain a selectively permeable hollow fiber bundle, wherein the shell defines a first flow port and a second flow port and at least a third flow port, and a selectively permeable hollow fiber bundle having a plurality of hollow fibers disposed within the shell such that a first flow circuit is defined between the first flow port and the second flow port, and a second flow circuit is defined in fluid communication with at least the third port such that an inner channel of one or more of the hollow fibers is in fluid communication with at least the third flow port, wherein second flow circuit is partially fluidly isolated from the first flow circuit such that at least one first fluid cannot pass through a wall of one or more hollow fibers, but such that at least one second fluid can pass through the wall of the one or more hollow fibers wherein the shell and the fiber bundle include a non-cylindrical shape.

In certain embodiments, an outer surface of the hollow fibers can be in fluid communication with the first flow circuit and an inner channel of one or more of the hollow fibers can be fluid communication with the second flow circuit. In certain embodiments, an outer surface of the hollow fibers can be in fluid communication with the second flow circuit and an inner channel of one or more of the hollow fibers is in fluid communication with the first flow circuit.

The non-cylindrical shape can be conformal to an aircraft component or structure, for example. In certain embodiments, the non-cylindrical shape can be conformal to an airframe of an aircraft. The non-cylindrical shape can be conformal to an engine casing, a fuel filter, an oil cooler, one or more fuel lines of an aircraft, and/or any other suitable aircraft portion and/or component (e.g., any suitable engine component).

In certain embodiments, the shell and/or fiber bundle are curved such that the shell forms a partial arc. The fiber bundle can be parallel to the axis of curvature, for example.

In certain embodiments, the shell and/or fiber bundle are flat or rectangular.

In certain embodiments, the non-cylindrical shape is a non-uniform shape. The non-uniform shape can include a flat portion and a curved portion, for example.

The fiber bundle can include two rigid ends such that the fiber bundle can be sealed to the shell at the two rigid ends. The two rigid ends can be formed by gluing the hollow fibers of the fiber bundle together.

A method for creating a fluid degassing device can include shaping a shell to include a non-cylindrical shape, inserting a selectively permeable hollow fiber bundle having a plurality of hollow fibers into the shell, and sealing ends of the fiber bundle to the shell such that two isolated flow paths are created in the device, one through the shell and one through the fiber bundle. Any other suitable method for making a device as described herein is contemplated herein.

In accordance with at least one aspect of this disclosure, a degassing arrangement can include a non-cylindrical housing defining a cavity with at least one inlet port and at least two outlet ports each fluidly connecting the cavity to an outside of the non-cylindrical housing such that fluid can flow into the cavity through the inlet port and out through at least one of the at least two outlet ports. The arrangement can also include a plurality of hollow fibers positioned within the cavity with walls selectively permeable to at least one gas, the plurality of hollow fibers being configured to allow the at least one gas to pass through the walls and exit the cavity via the second of the at least two outlets.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
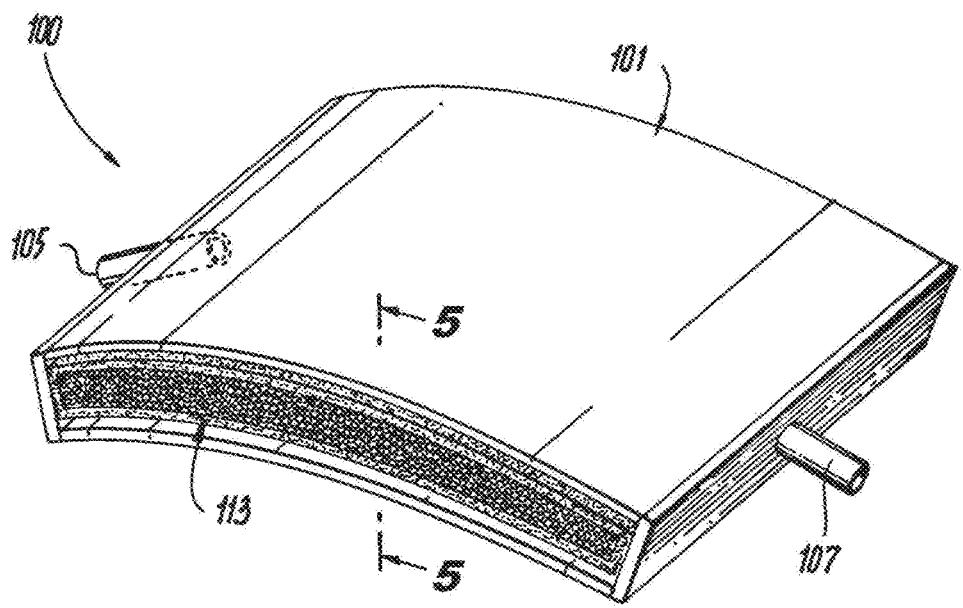
FIG. 1 is a perspective view of an embodiment of a device in accordance with this disclosure, showing a curved shape that is conformal to a curved structure.

Reference will now be made to the drawings wherein like reference numerals identify similar structural features or aspects of the subject disclosure. For purposes of explanation and illustration, and not limitation, an illustrative view of an embodiment of a device in accordance with the disclosure is shown in FIG. 1 and is designated generally by reference character 100. Other embodiments and/or aspects of this disclosure are shown in FIGS. 2-5. The systems and methods described herein can be used to more efficiently remove gas from liquids (e.g., oxygen from fuel), while conforming to a shape of surrounding structure.

Figure 2:
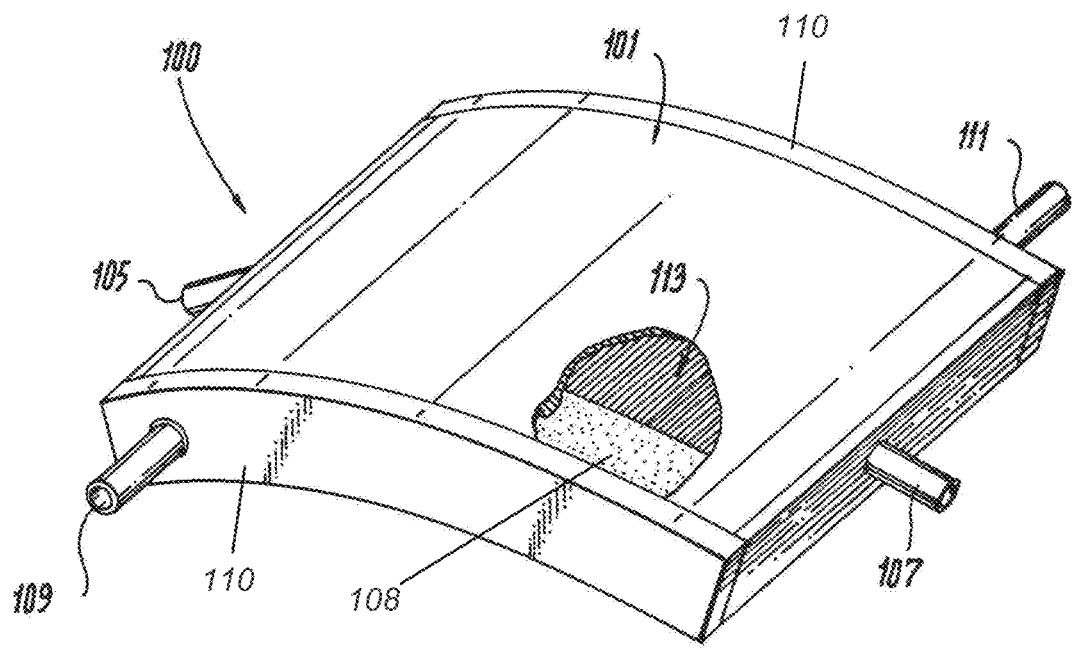
FIG. 2 is a cross-sectional view of the device of FIG. 1.

Referring to FIGS. 1 and 2, a fluid degassing device 100 can include a shell 101 configured to retain a selectively permeable hollow fiber bundle 113. The shell 101 defines a first flow port 105 and a second flow port 107. The shell 101 also defines at least a third flow port 109. In certain embodiments, the shell 101 can also define a fourth flow port 111.

A selectively permeable hollow fiber bundle 113 having a plurality of hollow fibers (not shown in detail) is disposed within the shell 101 such that a first flow circuit is defined between the first flow port 105 and the second flow port 107. A second flow circuit is defined in fluid communication with at least the third port 113 such that an inner channel of one or more of the hollow fibers is in fluid communication with at least the third port 113. The third flow port 113 can be in communication with all tubes to effectively remove the gas therefrom, for example.

One having ordinary skill in the art understands that the first flow ports 105, 107 are partially fluidly isolated from the second flow circuit (e.g., third port 109 and fourth port 111 as shown) in any suitable manner (e.g., rigid ends 108 sealed to the shell 101 as described below). The second flow circuit is partially fluidly isolated from the first flow circuit such that at least one first fluid (e.g., fuel) cannot pass through a wall of one or more hollow fibers, but such that at least one second fluid (e.g., oxygen, nitrogen) can pass through the wall of the one or more hollow fibers.

The shell 101 can be made of any suitable number of pieces and/or can be a single piece. For example, the shell 101 can include one or more manifolds 110 that cap the sealed ends of the fiber bundle 113 (e.g., to cap and define the second flow circuit). In certain embodiments, the manifolds 110 can include the third port 109 and/or the fourth port 111, for example.

In certain embodiments, the first flow circuit can be a fuel flow circuit and the second flow circuit can be a vacuum and/or purge gas circuit (e.g., such that an inert purge gas can be used to flush degassed gases from the inner channel of the tubes). In certain embodiments, the reverse flow scheme is possible such that fuel can be flowed through the second flow circuit inside the tubes of the tube bundle 113 and a purge gas and/or vacuum can be applied to the first flow circuit. In such embodiments, the first flow port 105 and the second flow port 109 can be in fluid communication with the inner channels of the hollow fibers and at least the third flow port 109 can be in fluid communication with an outer surface of the tubes in the tube bundle 113. While embodiments are described with reference to a first flow circuit and a second flow circuit, it is contemplated that these terms are interchangeable. For example, in certain embodiments, an outer surface of the hollow fibers can be in fluid communication with the first flow circuit and an inner channel of one or more of the hollow fibers can be in fluid communication with the second flow circuit. In such embodiments, fluid (e.g., jet fuel) can enter one of ports 105, 107, pass through the shell 101 while contacting an outer surface of the hollow fibers in the hollow fiber bundle 113, and pass out through the other of the ports 105, 107, while one or more gasses (e.g., oxygen) pass into the inner channel of the hollow fibers and can be removed through at least one of ports 109, 113 (e.g., sucked out with a vacuum which only requires a single port 109, 113 be present, and/or purged out with a purge gas that flows in one of ports 109, 113 and out the other of ports 109, 113). However, in certain embodiments, an outer surface of the hollow fibers can be in fluid communication with the second flow circuit and an inner channel of one or more of the hollow fibers is in fluid communication with the first flow circuit. In such embodiments, fluid (e.g., jet fuel) can pass through one of ports 109, 113 through the inner channels of the hollow fibers, and out through the other of ports 109, 113, while at least one gas (e.g., oxygen) passes into the cavity 535 of the shell 101 and is removed through at least one of ports 105, 107 (e.g., sucked out with a vacuum which only requires a single port 105, 107 be present, and/or purged out with a purge gas that flows in one of ports 105, 107 and out the other of ports 105, 107).

Any suitable flow circuit arrangement is contemplated herein. While the embodiment shown in FIG. 2 includes two ports 105, 107 and 109, 111 for each flow circuit, it is contemplated that if a flow circuit is a vacuum flow circuit, only a single port (e.g., 109 only) is needed.

As shown, the shell 101 and the fiber bundle 113 include a non-cylindrical shape unlike traditional devices. The non-cylindrical shape can be conformal to an aircraft component or structure, for example. The fiber bundle 113 as shown in FIG. 2 is for illustrative purposes only and is only partially shown.

In certain embodiments, the non-cylindrical shape can be conformal to an airframe of an aircraft (e.g., a curved section, a flat section). The non-cylindrical shape can be conformal to an engine casing (e.g., curved as shown in FIGS. 1 and 2), a fuel tank, an oil cooler (heat exchanger), one or more fuel lines of an aircraft, one or more pipes, and/or any other suitable aircraft portion and/or component (e.g., any suitable engine component).

In certain embodiments, the shell 101 and/or fiber bundle 113 are curved such that the shell 101 forms a partial arc (e.g., as shown in FIGS. 1 and 2). In certain embodiments, the shell 101 can be entirely annular. The fiber bundle 113 can be parallel to the axis of curvature as shown in FIG. 2, for example. However, any suitable fiber bundle 113 is contemplated herein, and individual fibers may weave in any suitable manner.

Figure 3:
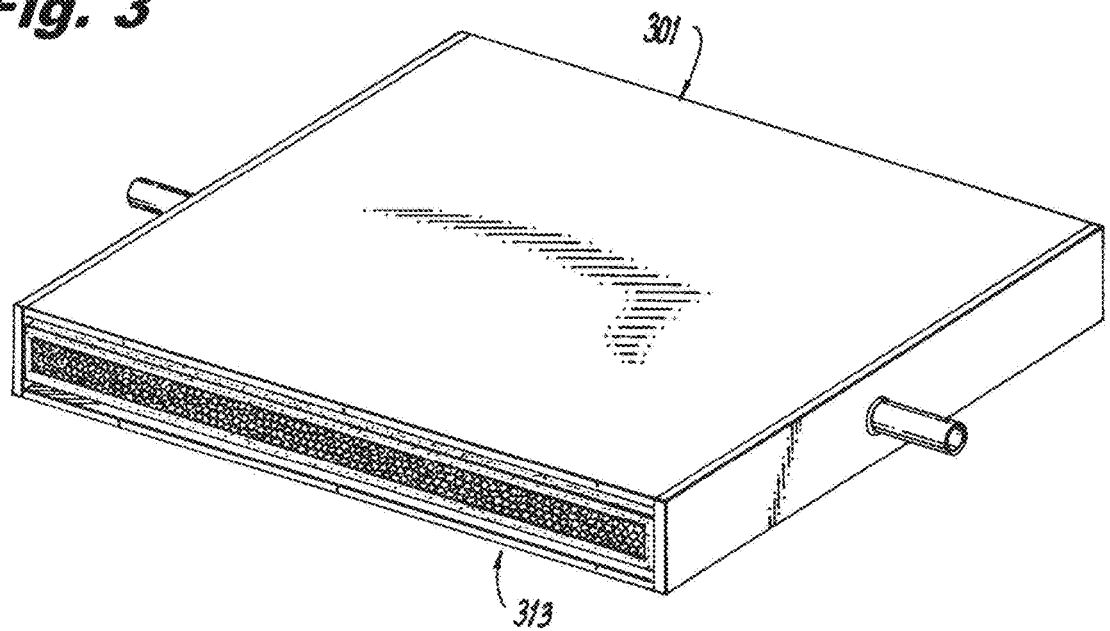
FIG. 3 is a cross-sectional view of an embodiment of a device in accordance with this disclosure, showing a flat and/or rectangular shape.
Figure 4:
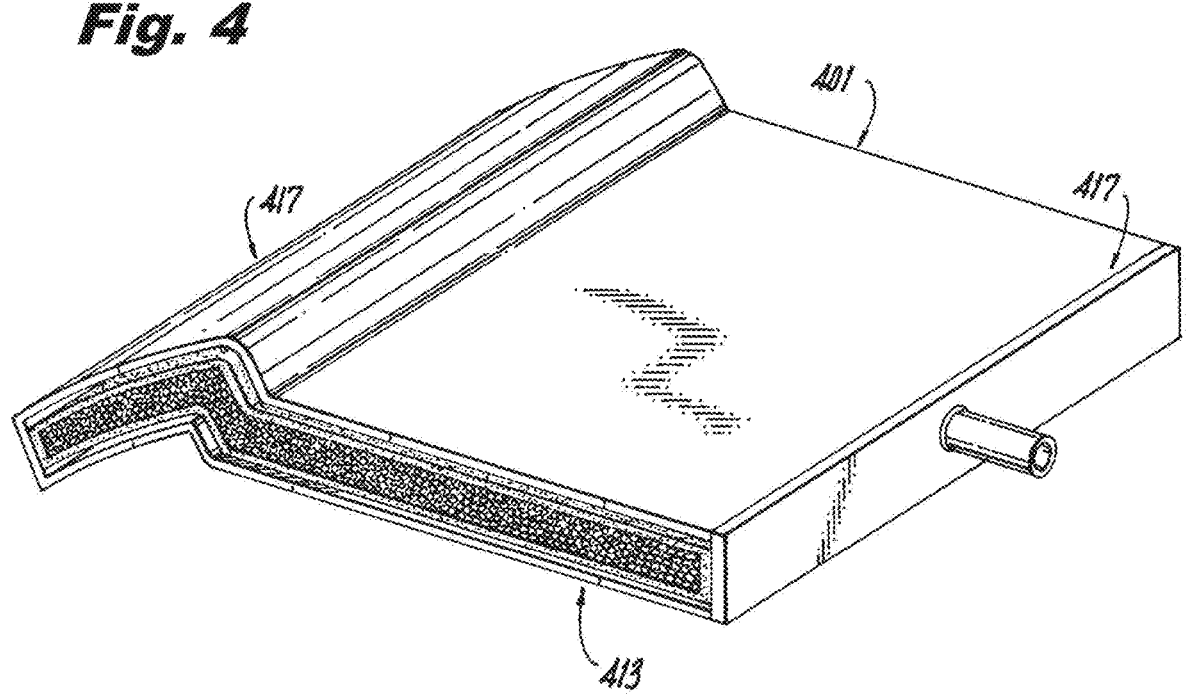
FIG. 4 is a cross-sectional view of an embodiment of a device in accordance with this disclosure, showing a non-uniform shape.

In certain embodiments, referring to FIG. 3, the shell 301 and/or fiber bundle 313 can be flat or rectangular. In certain embodiments, referring to FIG. 4, the non-cylindrical shape can be a non-uniform shape such that the shell 401 and the fiber bundle 413 are non-uniform. For example, the non-uniform shape can include a flat portion 415 and a curved portion 417.

Figure 5:
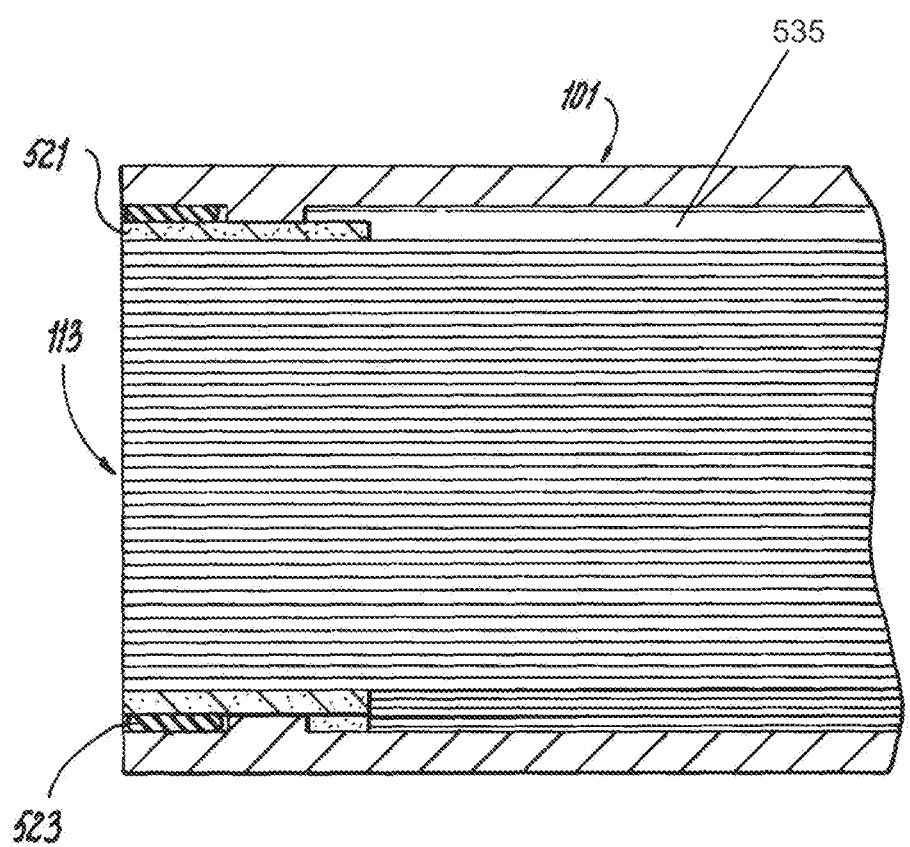
FIG. 5 is a perspective cross-sectional view of an embodiment of a fiber bundle disposed in a shell, showing a rigid end thereof sealed within the shell.

Referring to FIG. 5, the fiber bundle 113 can include two rigid ends 521 (only one shown) such that the fiber bundle 113 can be sealed to the shell 101 at the two rigid ends 521. The two rigid ends 521 can be formed by gluing (e.g., with epoxy 523 or any other suitable material) the hollow fibers of the fiber bundle 113 together. The hollow fibers remain open on at least one of their ends for fluid contact with a purge gas or vacuum.

Certain embodiments include a degassing arrangement that can include a non-cylindrical housing (e.g., shell 101) defining a cavity (e.g., cavity 535 as shown in FIG. 5) with at least one inlet port (e.g., port 109) and at least two outlet ports (e.g., ports 109 and 111, or ports 111 and 113). Each fluidly connects the cavity to an outside of the non-cylindrical housing such that fluid can flow into the cavity through the inlet port and out through at least one of the at least two outlet ports. The arrangement can also include a plurality of hollow fibers positioned within the cavity with walls selectively permeable to at least one gas, the plurality of hollow fibers being configured to allow the at least one gas to pass through the walls and exit the cavity via the second of the at least two outlets.

A method for creating a fluid degassing device can include shaping a shell to include a non-cylindrical shape, inserting a selectively permeable hollow fiber bundle having a plurality of hollow fibers into the shell, and sealing ends of the fiber bundle to the shell such that two isolated flow paths are created in the device, one through the shell and one through the fiber bundle. Any other suitable method for making a device as described herein is contemplated herein.

Traditional hollow fiber membrane units have an overall cylindrical shape. Embodiments include hollow fiber membrane units that have non-circular shapes which enables better packaging as well as space and weight reduction. Embodiments can include a large aspect ratio such that the embodiments can be fairly thin in the radial dimension for example.

As described above, embodiments enable better adoption of an fuel stabilization unit and/or oxygen removal unit. Such devices allow higher fuel temperatures which have an overall cycle benefit which reduces specific fuel consumption of the engine. Devices enables a more effective heat sink. Embodiments provide the ability to package a hollow fiber oxygen removal unit/fuel stabilization unit into the available volume on an engine or aircraft.

The methods and systems of the present disclosure, as described above and shown in the drawings, provide for gas removal units with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fluid degassing device, comprising:
a shell configured to retain a selectively permeable hollow fiber bundle, wherein the shell defines a first flow port, a second flow port, and at least a third flow port;
a selectively permeable hollow fiber bundle having a plurality of hollow fibers disposed within the shell such that a first flow circuit is defined between the first flow port and the second flow port, and a second flow circuit is defined in fluid communication with at least the third port,
wherein second flow circuit is partially fluidly isolated from the first flow circuit such that at least one first fluid cannot pass through a wall of one or more hollow fibers, but such that at least one second fluid can pass through the wall of the one or more hollow fibers,
wherein the shell and the fiber bundle include a non-cylindrical shape, wherein the shell and/or fiber bundle are curved such that the shell forms a partial arc, wherein the fiber bundle is parallel to an axis of curvature, wherein the partial arc is defined around the axis of curvature.

2. The device of claim 1, wherein an outer surface of the hollow fibers is in fluid communication with the first flow circuit and an inner channel of one or more of the hollow fibers is in fluid communication with the second flow circuit.

3. The device of claim 1, wherein an outer surface of the hollow fibers is in fluid communication with the second flow circuit and an inner channel of one or more of the hollow fibers is in fluid communication with the first flow circuit.

4. The device of claim 1, wherein the non-cylindrical shape is conformal to an aircraft component or structure.

5. The device of claim 4, wherein the non-cylindrical shape is conformal to an airframe of an aircraft.

6. The device of claim 4, wherein the non-cylindrical shape is conformal to an engine casing.

7. The device of claim 4, wherein the non-cylindrical shape is conformal to a fuel filter.

8. The device of claim 4, wherein the non-cylindrical shape is conformal to an oil cooler of an aircraft.

9. The device of claim 4, wherein the non-cylindrical shape is conformal to fuel lines of an aircraft.

10. The device of claim 1, wherein the shell and/or fiber bundle are partially flat or rectangular.

11. The device of claim 4, wherein the non-cylindrical shape is a non-uniform shape.

12. The device of claim 11, wherein the non-uniform shape includes a flat portion and a curved portion.

13. The device of claim 1, wherein the fiber bundle includes two rigid ends such that the fiber bundle can be sealed to the shell at the two rigid ends.

14. The device of claim 13, wherein the two rigid ends are formed by gluing the hollow fibers of the fiber bundle together.

15. A method for creating a fluid degassing device, comprising:
shaping a shell to include a non-cylindrical shape, wherein the shell is curved such that the shell forms a partial arc, wherein the shell parallel to an axis of curvature;
inserting a selectively permeable hollow fiber bundle having a plurality of hollow fibers comprising a plurality of tubes into the shell, wherein the fiber bundles are parallel with the axis of curvature; and
sealing ends of the fiber bundle to the shell such that two partially isolated flow paths are created in the device, one through the shell and one through the inner channels of tubes of the fiber bundle.

16. A degassing arrangement comprising:
a non-cylindrical housing defining a cavity with at least one inlet port and at least two outlet ports each fluidly connecting the cavity to an outside of the non-cylindrical housing such that fluid can flow into the cavity through the inlet port and out through at least one of the at least two outlet ports; and
a plurality of hollow fibers positioned within the cavity with walls selectively permeable to at least one gas, the plurality of hollow fibers being configured to allow the at least one gas to pass through the walls and exit the cavity via the second of the at least two outlets, wherein the plurality of fibers are curved such that the plurality of fibers forms a partial arc, wherein the plurality of fibers is parallel to an axis of curvature, wherein the partial arc is defined around the axis of curvature.

\* \* \* \* \*